Figure 1:
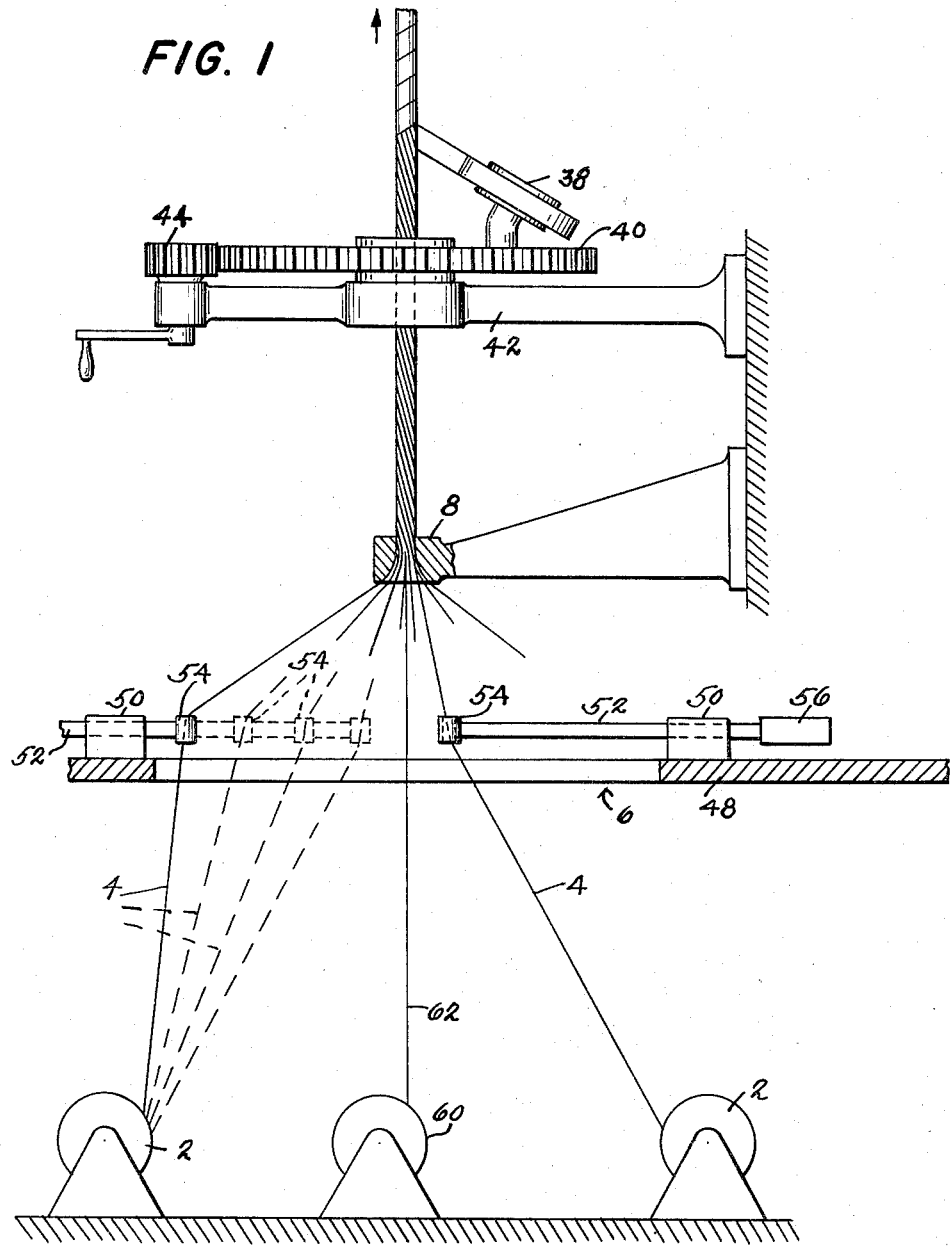

Sept. 26, 1961 R. P. LAPSLEY 3,001,353
METHOD OF AND APPARATUS FOR MANUFACTURING
DYNAMICALLY BALANCED, STRANDED
ELECTRICAL CONDUCTORS
Filed March 2, 1959 4 Sheets-Sheet 1

INVENTOR.
RHEA P. LAPSLEY
BY
ATTORNEY.

Sept. 26, 1961

R. P. LAPSLEY 3,001,353

METHOD OF AND APPARATUS FOR MANUFACTURING
DYNAMICALLY BALANCED, STRANDED
ELECTRICAL CONDUCTORS

Filed March 2, 1959

4 Sheets-Sheet 2

INVENTOR.
RHEA P. LAPSLEY

BY
*James G. Bethell*

ATTORNEY.

Sept. 26, 1961 R. P. LAPSLEY 3,001,353
METHOD OF AND APPARATUS FOR MANUFACTURING
DYNAMICALLY BALANCED, STRANDED
ELECTRICAL CONDUCTORS
Filed March 2, 1959 4 Sheets-Sheet 3

INVENTOR.
RHEA P. LAPSLEY
BY
James G. Bethell
ATTORNEY

Sept. 26, 1961  R. P. LAPSLEY  3,001,353
METHOD OF AND APPARATUS FOR MANUFACTURING
DYNAMICALLY BALANCED, STRANDED
ELECTRICAL CONDUCTORS
Filed March 2, 1959  4 Sheets-Sheet 4

INVENTOR.
RHEA P. LAPSLEY
BY
*James G. Bethell*
ATTORNEY.

3,001,353
METHOD OF AND APPARATUS FOR MANUFACTURING DYNAMICALLY BALANCED, STRANDED ELECTRICAL CONDUCTORS
Rhea P. Lapsley, Ridgewood, N.J., assignor to The Okonite Company, Passaic, N.J., a corporation of New Jersey
Filed Mar. 2, 1959, Ser. No. 796,580
5 Claims. (Cl. 57—12)

This invention relates to a method of and apparatus for manufacturing dynamically balanced, stranded electrical conductors of the type where the conductor is composed of strands laid up in layers with a uni-directional lay. All strands have substantially the same length of lay and are transposed at intervals from one layer to an adjacent layer, so that in a complete transposition length all strands will have the same length, and each strand will have occupied positions in each layer for the same length as every other strand.

More specifically, in the manufacture of this conductor the conductor strands are transposed in succession in an orderly fashion from one strand position to the next, so that throughout successive complete transposition lengths of conductor the reactance and resistance of every strand is the same; furthermore, each strand will have occupied each of the various strand positions within the various layers in the conductor within each of the complete transposition lengths, and the strands of a complete transposition length of the conductor will all be of the same length. Such a conductor construction has a high volume efficiency as compared with braided conductors, such as Litz wire, for example, as in the conductor of my invention all strands have a uni-directional lay and the same length of lay, therefore the strands of each layer lie side by side between transposition points, with strands of the overlying layers nesting into available interstices between strands of underlying layers. This nesting of strands in interstices brings the strands of the various layers into closest possible contiguity with strands of other layers, thus to provide a conductor of high-volume efficiency, whereas in Litz wire the strands of each overlying layer cross strands of underlying layers at an angle so as to hold strands of various layers more remote from other strands of the conductor, giving low-volume efficiency.

Figure 2:
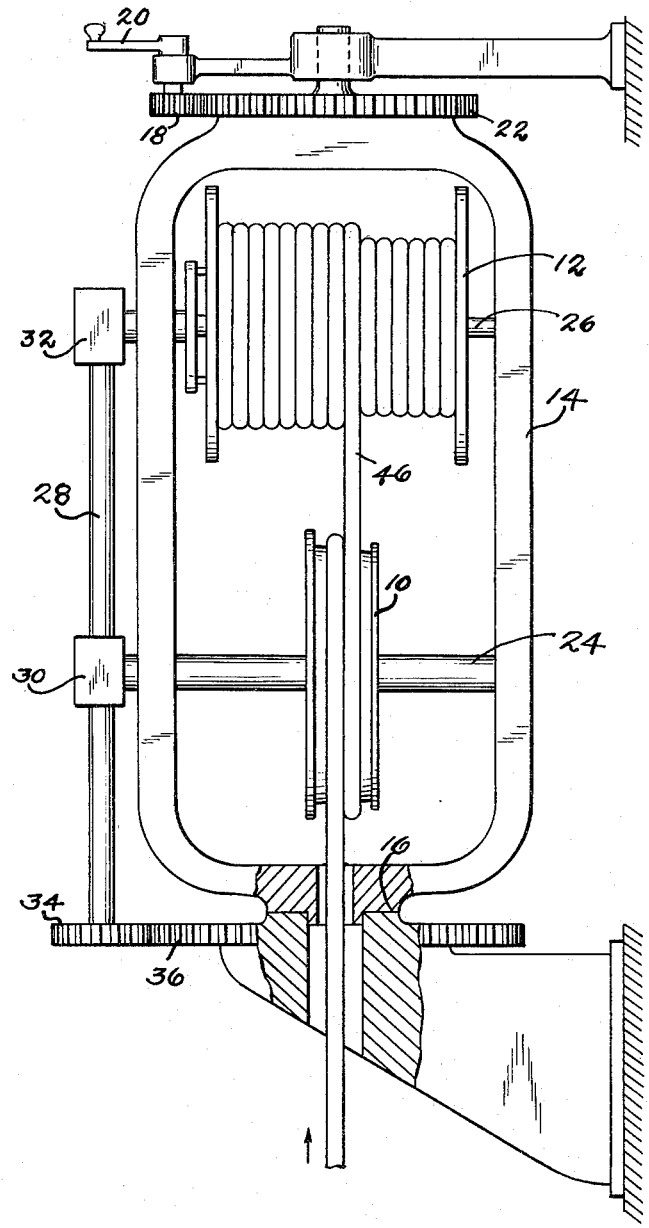
Figure 3:
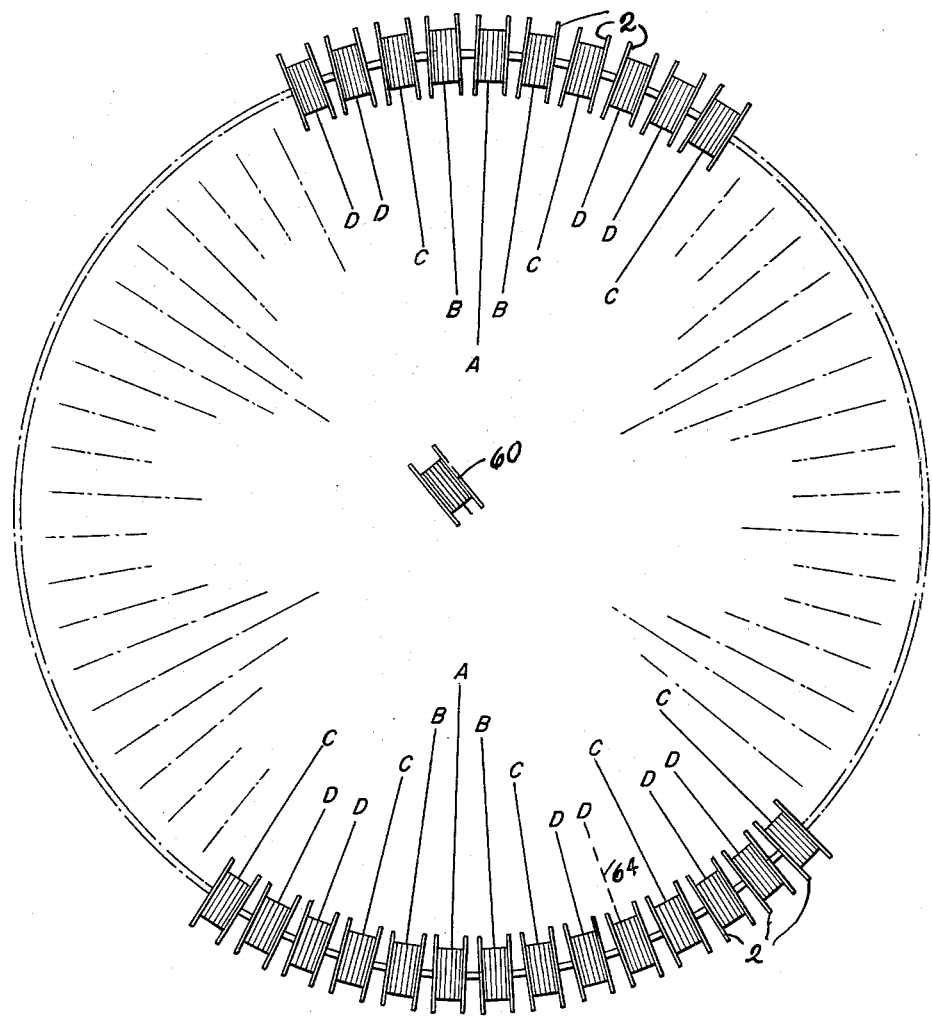
Figure 4:
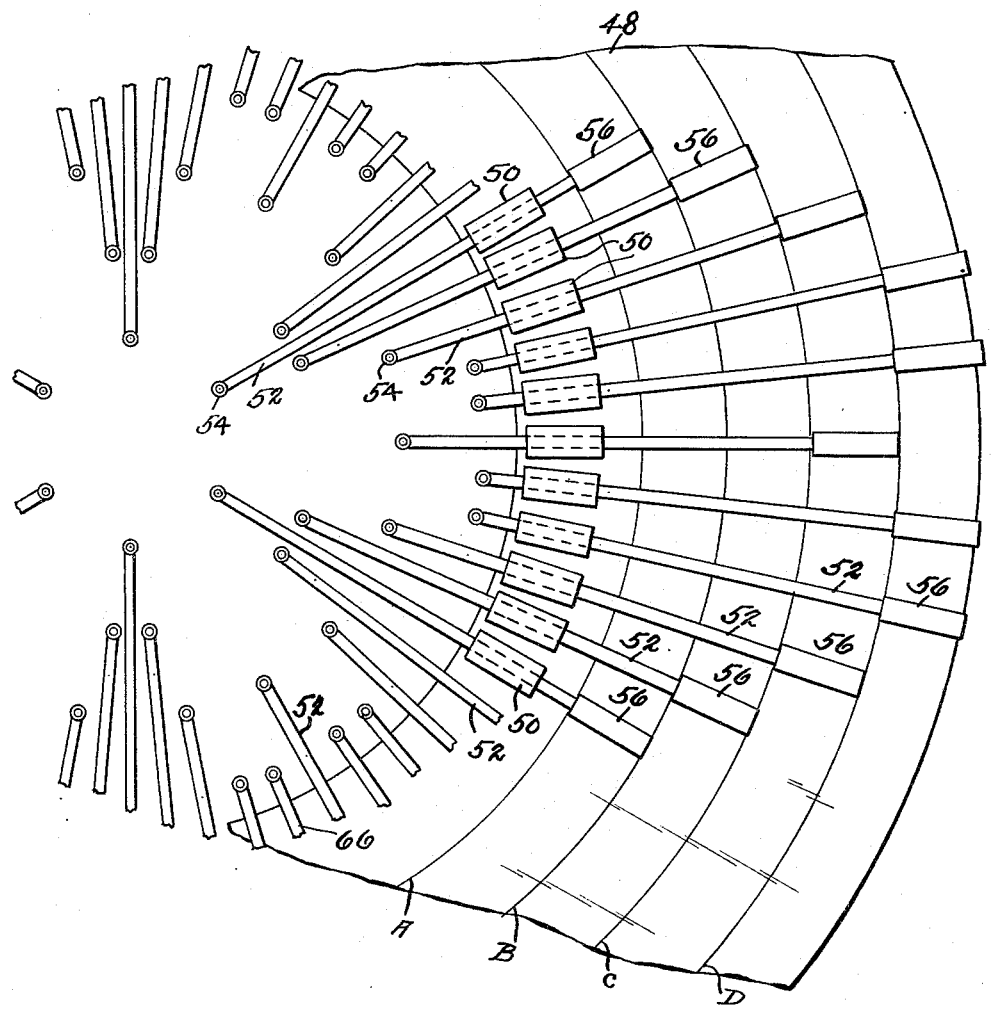

In the accompanying drawings,

FIGS. 1 and 2, taken together, show in part-sectional elevation an embodiment of one apparatus suitable for use in the practice of the method of this application;

FIG. 3 is a schematic view illustrating the layout of the let-off reels as well as relative positioning of strand-positioning rods at one instant during the passage of the strands through the apparatus; and FIG. 4 is a fragmentary, elevational view of transposition mechanism whereby transposition of the strands of the conductor can be effected.

Before proceeding with the detailed description of the method and apparatus of this invention, it should be noted that in the conventional manufacture of electric conductors of the general type to which this invention relates, viz., stranded, concentric conductors, the conductor strands travel from revolving let-off reels to a closing die, where one strand layer is closed. This layer then goes through succeeding groups of let-off reels and closing dies until the required number of strands and layers has been applied. It is the usual practice to swing the let-off reels around the center strand or layers and take up on a fixed-position reel rotated about its axis. It is common practice also to apply alternate layers of round strands in reverse directions. It will be obvious that each strand stays throughout the entire conductor length in the same layer of the conductor to which it is initially applied.

Another common practice in the manufacture of stranded electric conductors is to employ the so-called "bunching" method. In such a method the let-off reels are set up in one group only, and the strands from these reels pass through a multi-holed guide plate and from thence to a closing die. The take-up reel is revolved about an axis at right angles to the axis of the reel, thus twisting the bunch of strands together at the closing die. The take-up reel is also revolved about the axis of the reel to wind up the finished conductor.

In these two conventional practices no attempt is made to guide the strands into transposed positions in a predetermined pattern. In other words, strands are not transposed between layers or in succession in an orderly fashion from one strand position to the next to produce a conductor in which the conductor strands of a complete transposition length are all of the same length and in which each strand will occupy each of the various strand positions within a complete transposition length of the conductor.

Referring to the drawings in detail and first of all to FIGS. 1 and 2:

The insulated strands 4 are drawn from a group of let-off reels 2 through transposition mechanism 6 and closing die 8 by a driven capstan 10, the finished conductor being wound upon driven take-up reel 12. For simplicity, each of the let-off reels has been shown as fixed in position but rotatable about its own axis. The capstan 10 and take-up reel 12 are carried by a rotatable carriage 14, which is mounted in suitable bearings 16. This carriage is rotatable through the medium of a gear 18, driven by hand crank 20 and meshing with a gear 22, rigidly mounted on the end of the carriage.

The capstan 10 and take-up reel 12 are mounted on shafts 24 and 26, respectively, which are mounted in suitable bearings on the rotatable carriage 14. A drive shaft 28 extends along and adjacent one side of the carriage 14, parallel to the axis of rotation of the carriage, and the capstan shaft 24 is connected to this shaft through a positive drive 30, while the shaft 26 of the take-up reel 12 is connected to the drive shaft 28 through a slip drive 32. On the end of the drive shaft 28 remote from the positive drive 30 and slip drive 32 is a "spur" gear 34, in constant mesh with a fixed gear 36, the axis of which coincides with the axis of rotation of the carriage 14.

Intermediate the closing die 8 and the rotatable carriage 14 is a taping head 38, carried by a gear 40, which is rotatably mounted on a suitable stanchion 42. Hand-driven gear 44, in constant mesh with taping-head gear 40, is mounted on the stanchion 42 to provide a drive for the taping head.

It will be apparent from the description thus far given that, after the machine has been threaded up, rotation of the hand crank 20 will effect rotation of the carriage 14, to carry the capstan 10 and take-up reel 12 about the axis of rotation of the carriage and at the same time effect rotation of the capstan and take-up reel on their individual axes. This operation will draw the strands 4 lengthwise from the let-off reels 2 and through the closing die 8, where they are progressively compacted and twisted together into a conductor, tape being applied to the conductor progressively as the conductor is drawn past the taping head 38. The finished conductor 46 is finally wound upon the take-up reel 12. It will be apparent from the mechanical linkages of the crank 20 with the capstan 10 that, for each revolution of the crank 20, a definite length of conductor will be formed at the closing die 8 as the conductor is drawn lengthwise by the capstan.

It will be appreciated that each wire, in traveling from let-off reels 2 to take-up reel 12, will be twisted one revolution on its own axis for each rotation of the carriage 14, similar to the twist imparted to strands on any commercial "fixed bobbin" stranding equipment. Where this twist of the individual strands on their own axes is undesirable, it can be eliminated, of course, by arranging for each let-off reel to be separately rotated about an axis at right angles to the axis of the shaft of the reel. As the carriage 14 is revolved one turn, each of the let-off reels 2 is also revolved one turn in the same hand at right angles to the shaft of the reel. A so-called planetary layup is thus obtained, which is familiar to those skilled in the art. As stated above, the reels 2 have for simplicity been shown to give a fixed-bobbin type of layup, but revolving reels 2 at right angles to the shaft of the individual reels to give a planetary type of layup are also contemplated to be within the scope of this invention.

The apparatus thus far described is more or less conventional and will not effect transposition of the conductor strands 4 from one layer to an adjacent layer.

Reverting to the transposition mechanism 6 and to FIGS. 1 and 4 in particular, 48 designates an annular plate, on one face of which are scribed four positions—A, B, C, and D. Four positions have been shown merely for illustrative purposes, it being distinctly understood that this number may be decreased or increased within the contemplation of this invention. On this same face of the plate 48 are bearings 50 for manually operated, or shifted strand-positioning rods 52. Each of these rods 52 carries a strand-guiding eyelet 54 on its inner end and at its outer end is provided with a handle 56 for manually shifting each rod individually longitudinally through its bearings 50, thereby moving eyelet 54 closer to or farther from an extension of the central axis of the conductor 46 formed at the closing die 8, which extension is identical with an extension of the axis of the closing die 8.

As will be seen from FIG. 3, the let-off reels 2 are arranged in an annulus or circle and, in threading the machine initially, it will be understood, a strand from each let-off reel 2 is passed through a corresponding eyelet 54 of a rod 52, so that, as each rod 52 is manually shifted, eyelet 54 is shifted closer to or farther from the extension of the central axis of the conductor, thereby giving a different angle of approach of the strand to the closing die for each different position of the strand-positioning rods.

It will be apparent that, if the handle 56 of one of the strand-positioning rods 52 is manually positioned so that the inner end of the handle coincides with position A on the plate 48, the conductor strand 4, which is threaded through the eyelet 54 of that rod, will approach the closing die 8 at a small angle to a line along the axis of the closing die. Now if the rod be manually shifted outwardly relative to the plate 48 so that the inner end of its handle coincides with position B on the plate, the conductor strand 4 will be deflected outwardly relative to an extension of the conductor axis and the angle of approach of the conductor strand to the die 8 will be increased, and by manually shifting the handle successively to positions C and D, the conductor strand 4 will be deflected farther and farther outwardly relative to an extension of the conductor axis and the angle of approach of the strand to the closing die will be further and further increased. Conversely, moving the handle 56 from the D to C position or from C to B position or from B to A position will deflect the strand 4 toward an extension of the conductor axis and decrease the angle of approach of the strand to the closing die 8.

The radial position or depth within the conductor assumed by each strand in the conductor as it passes through the closing die is obviously related to the angle at which the strand approaches the closing die 8. Thus, a strand approaching the closing die at a small angle will assume a radial position farther into the conductor and nearer the conductor longitudinal central axis than when approaching the closing die at a larger angle. After passing the closing die 8, the conductor strands are twisted together, remaining in the layer assumed within the conductor while passing through the die. Great differences in tension on the different strands will have some effect on ease of positioning of the strands and maintaining the strands in position. To avoid such difficulties, tension on the strands is kept acceptably uniform by the use of any of the well known, conventional tension-regulating and control means. It will be seen that, by varying the positions of the strand-positioning rods 52 in a definite pattern, illustrated below, properly synchronized with the speed of advance or take-up of the conductor, each strand can be transposed radially from one layer of the conductor to the next, so that, in a complete transposition length of conductor, each strand will have occupied each strand position within that length, and that the strands will all be of the same length; and, therefore, when carrying current, the electrical impedance vector will be the same for every strand.

In the machine illustrated there are sixty strand-positioning rods 52 and sixty let-off reels 2. In addition to the let-off reels 2, a let-off reel 60 has been shown, disposed centrally of the group of reels 2, this reel carrying a filler or center strand 62. It is to be understood that the showing of sixty let-off reels is purely illustrative and not to be construed as definitive.

In FIG. 3 the setting of the strand-positioning rods 52 at one instant in the passage of the strands 4 to the closing die 8 has been indicated, the rods 52 being shown in this same position at the same instant in FIG. 4. It is apparent that, at the instant illustrated, the strands 4, controlled by the strand-positioning rods 52, which are shown set in the A position, will lie in the innermost, or first, layer from the longitudinal axis of that portion of the conductor being formed at that instant. Similarly, the strands controlled by the strand-positioning rods which are shown set in the B position will approach the closing die 8 at a larger angle and lie in the second layer of that portion of the conductor being formed at that instant. Those strands controlled by the strand-positioning rods which are set in the C position will approach the closing die 8 at a still larger angle and lie in the third layer of that portion of the conductor being formed at that instant, while those strands controlled by the strand-positioning rods which are set in the D position will approach the closing die 8 at yet a larger angle and lie in the fourth or, in this example, outer layer of that portion of the conductor being formed at that instant. Thus it can be seen that, when a strand-positioning rod 52 is moved from one of its positions to another, the strand threaded through the rod will change from one layer to another in that portion of the conductor being formed at that instant, the strand-layer change corresponding to the change in the rod position. For example, if a rod is moved from the A to the B position, its corresponding strand will change from the first to the second layer of the conductor.

Although it is not essential, it is preferred that, in setting up the machine, one strand position be left open. It can be seen that the unthreaded rod will cause the corresponding conductor layer to be one strand short, thereby making transposition into this layer easier to accomplish. For example, the strand shown in broken lines in FIG. 3 and designated 64 may be omitted, so that the strand-positioning rod designated 66 in FIG. 4 for that strand will be inactive.

As a further aid in making transposition of strand 4 from one layer to another more positive, the movements of the strand-positioning rods may be "overshot," viz., in movement from the D to the C position the rod can be moved somewhat past the C position and then returned to the C position in one movement. This overshot of the desired position will more quickly and positively force the movement of strands through die 8 and thereby permit a shorter transposition length.

With the machine threaded up as illustrated in FIGS. 3 and 4, crank 20 is turned one revolution, for example, and at the same time strand-positioning rod 52 immediately adjacent the inactive rod 66 is manually moved from C to D position, so that the strand controlled by that strand-positioning rod is moved from the third layer of the conductor into the fourth layer into the vacant position provided by omission of conductor strand 64. As turning of the crank 20 continues through the second revolution, the next counter-clockwise and adjacent strand-positioning rod 52, which has been standing in D position, will be moved to C position to carry its strand from the fourth layer to the third layer of the conductor into the strand position just vacated in the third layer of the conductor by shifting of the preceding strand.

Advance and transposition of the strands continues in this manner, that is, sequential single movements of rods starting with the rod next to the inactive rod 66 and proceeding in a counter-clockwise direction around the rods illustrated in FIG. 4, one rod movement being made for each one revolution, for example, of crank 20, until all active strand-positioning rods have been shifted one position in a predetermined cycle of positions. For example, the cycle for a rod may be the sequence of positions A, B, C, D, D, C, D, D, C, B, and then return to A to repeat the cycle if desired, the various rods being at various stages of their respective cycle at any one time. All rods have the same sequence of movements but different starting positions within the cycle. The starting position of any rod is determined by the position of that rod at the original setup of the machine. Specifically, the strand-positioning rod next to the inactive rod 66 in a counter-clockwise direction has the cycle starting at C and then D, D, C, B, A, B, C, D, D, and back to C. The cycle of the next rod in a counter-clockwise direction starts at D, then C, D, D, C, B, A, B, C, D, and back to D. The cycle of the next counterclockwise rod starts at D, then D, C, D, D, C, B, A, B, C, and back to D. In like manner, the starting position in the cycle for any rod can be determined by referring to FIG. 4. The starting position of any rod is the position shown in the figure, the rest of the sequence of movement of that rod can be obtained by noting, in order, in a clockwise direction, the positions of the next nine rods, the position of the tenth rod in a clockwise direction corresponding to a return to the original position for a repetition of the cycle. After each rod has made one movement in its respective cycle, the set of all active rods is then moved, in the same order, to the next position in the predetermined cycle for each rod. This series of rod movements, synchronized with revolutions of the crank 20 and, therefore, with advance of the conductor 46, is continued until each of the active rods has moved through all of its positions in its cycle. The strands threaded through these strand-positioning rods will have been transposed from layer to layer corresponding to the sequence of movements of the rod corresponding to any strand. The twisting of the strand bundle in conjunction with the transposition between layers described above will cause the fabrication of a length of conductor in which all strands occupy substantially all positions within the conductor cross-section. The length of conductor required for each strand-positioning rod to have completed its entire cycle of movements exactly once shall be designated a "complete transposition length."

The statement that each strand occupies every strand position is from the electrical point of view rather than describing the actual physical conductor construction. Since the strands are all transposed in exactly the same manner, each strand will have a fixed length in any given layer in a given complete transposition length. In addition to the transposition of strands between layers, the twisting of the conductor at the closing die causes each strand substantially to occupy all strand positions along the pitch circle of any given layer. Thus, in a given complete transposition length, each strand is subjected to substantially the same fields as any other strand; and the differences that exist due to the fact that every strand does not have exactly the same length in a given strand position along the pitch circle of a layer are so minute that they are negligible. Hence, the conductor construction may be described as substantially obtaining the ideal of having every strand occupying the same length in any given strand position in the conductor as every other strand does. It will be appreciated furthermore that, in such a length of conductor, all strands will be of the same length, and that the electrical impedance vector of each strand will be the same as that in all other strands when the conductor is carrying current.

It will be understood also that, by repetition of this process, a conductor of any length desired can be produced.

In the transposition pattern above described, one strand of a 60-strand-position conductor was omitted to provide space into which the first strand to be transposed was moved, making room for the second, which in turn makes room for the third, and so on. It will be appreciated that, if more than one strand be omitted in the threading operation, there will be room into which to transpose more than one strand at a time. By the proper choice of omitted strands and a suitable modification of the transposition pattern, it is possible to reduce the complete transposition length by a factor of one-half or better. For example, by omitting two opposite strands and moving two opposite rods at the same time, the complete transposition length will be approximately one-half the complete transposition length of the first illustrated one, in which only one strand was omitted and in which only one rod was moved at a time. The possible combinations are too numerous to be included, but they are all just additional variations of the given illustration.

It is to be understood also that all the strands could be transposed one position in their cycle, all at the same time, and such a conductor would have an extremely short transposition length but would have a non-uniform O.D.

From all of the foregoing it will be seen that the present invention provides a method of and apparatus for manufacturing stranded electrical conductors in which each strand of successive unit lengths of conductor is transposed in a predetermined pattern so as to occupy all strand positions within each complete transposition length, to provide a dynamically balanced conductor in which, assuming all strands are of the same cross-section, each strand will have the same resistance and reactance, and each strand will be of the same length as every other strand in each complete transposition length.

It is to be understood that changes may be made in the details of construction and arrangement of parts of the apparatus described within the purview of the invention.

What I claim is:

1. The method of manufacturing a stranded electric conductor, which method comprises advancing a plurality of conductor strands simultaneously from a strand supply to a compacting and twisting area, where the strands are laid up in layers and a unidirectional twist is imparted to the strand group; deflecting the strands in predetermined sequence intermediate the strand supply and the compacting and twisting area in a direction substantially restricted to straight-line movement toward and away from the conductor axis, to vary the angle of approach of the deflected strands to the compacting and twisting area; and so controlling the extent of strand deflection and the timing of said deflection relative to the rate of advance of the strands and the rate of twisting of the strand group that, in a complete transposition length of conductor, the strands will be laid up side by side in layers, with the strands of overlying layers nesting in available interstices in underlying layers, and all strands will have substantially the same length of lay, and each strand will occupy all strand positions in each layer, and all strands will have substantially equal electrical impedance.

2. The method of manufacturing a stranded electric conductor, which method comprises advancing a plurality of conductor strands simultaneously from a strand supply to a compacting and twisting area, where the strands are laid up in layers and a unidirectional twist is imparted to the strand group; deflecting the strands individually in predetermined sequence intermediate the strand supply and the compacting and twisting area in a direction substantially restricted to straight-line movement toward and away from the conductor axis, to vary the angle of approach of the deflected strands to the compacting and twisting area; and so controlling the extent of strand deflection and the timing of said deflection relative to the rate of advance of the strands and the rate of twisting of the strand group that, in a complete transposition length of conductor, the strands will be laid up side by side in layers, with the strands of overlying layers nesting in available interstices in underlying layers, and all strands will have substantially the same length of lay, and each strand will occupy all strand positions in each layer, and all strands will have substantially equal electrical impedance.

3. The method of manufacturing a stranded electric conductor, which method comprises advancing a plurality of conductor strands simultaneously from a strand supply to a compacting and twisting area, where the strands are laid up in layers and a uni-directional twist is imparted at a constant rate to the strand group; deflecting the strands in predetermined sequence intermediate the strand supply and the compacting and twisting area in a direction which is restricted to straight-line movement toward and away from the conductor axis, to vary the angle of approach of the deflected strands to the compacting and twisting area; and so controlling the extent of strand deflection and the timing of said deflection relative to the rate of advance of the strands and the rate of twisting of the strand group that, in a complete transposition length of conductor, the strands will be laid up side by side in layers, with the strands of overlying layers nesting in available interstices in underlying layers, and all strands will have substantially the same length of lay, and each strand will occupy all strand positions in each layer, and all strands will have substantially equal electrical impedance.

4. An apparatus for manufacturing stranded electric conductors, said apparatus comprising, in combination, a plurality of let-off reels, each carrying a conductor strand; a closing die; a take-up reel; means intermediate the said die and said take-up reel for advancing the conductor strands simultaneously from the let-off reels through said die to compact the strands and for twisting the compacted strands uni-directionally and progressively to provide a conductor in which the strands are laid up in layers; and non-rotatable guiding means intermediate the let-off reels and said die for guiding each strand to the die, said guiding means being adjustable to deflect the conductor strands sequentially in a direction which is restricted to straight-line movement toward and away from the conductor axis, so to vary the angle of approach of each strand to the die that, in a complete transposition length of conductor, all strands will have substantially the same length of lay, each strand will occupy all strand positions in each layer, and all strands will have substantially equal electrical impedance.

5. An apparatus for manufacturing stranded electric conductors, said apparatus comprising, in combination, a plurality of let-off reels, each carrying a conductor strand; a closing die; a take-up reel; means intermediate the said die and said take-up reel for advancing the conductor strands simultaneously from the let-off reels through said die to compact the strands and for twisting the compacted strands uni-directionally and progressively to provide a conductor in which the strands are laid up in layers; and non-rotatable guiding means intermediate the let-off reels and said die for guiding each strand to the die, said guiding means being individually adjustable to deflect the conductor strands individually and in predetermined sequence in a direction which is restricted to straight-line movement toward and away from the conductor axis, so to vary the angle of approach of each strand to the die that, in a complete transposition length of conductor, all strands will have the same length of lay, each strand will occupy all strand positions in each layer, and all strands will have substantially equal electrical impedance.

References Cited in the file of this patent

UNITED STATES PATENTS

| | | |
|---|---|---|
| 2,249,509 | Welch | July 15, 1941 |
| 2,412,196 | Ashbaugh et al. | Dec. 10, 1946 |
| 2,678,527 | Meyers et al. | May 18, 1954 |